Patented Sept. 8, 1931

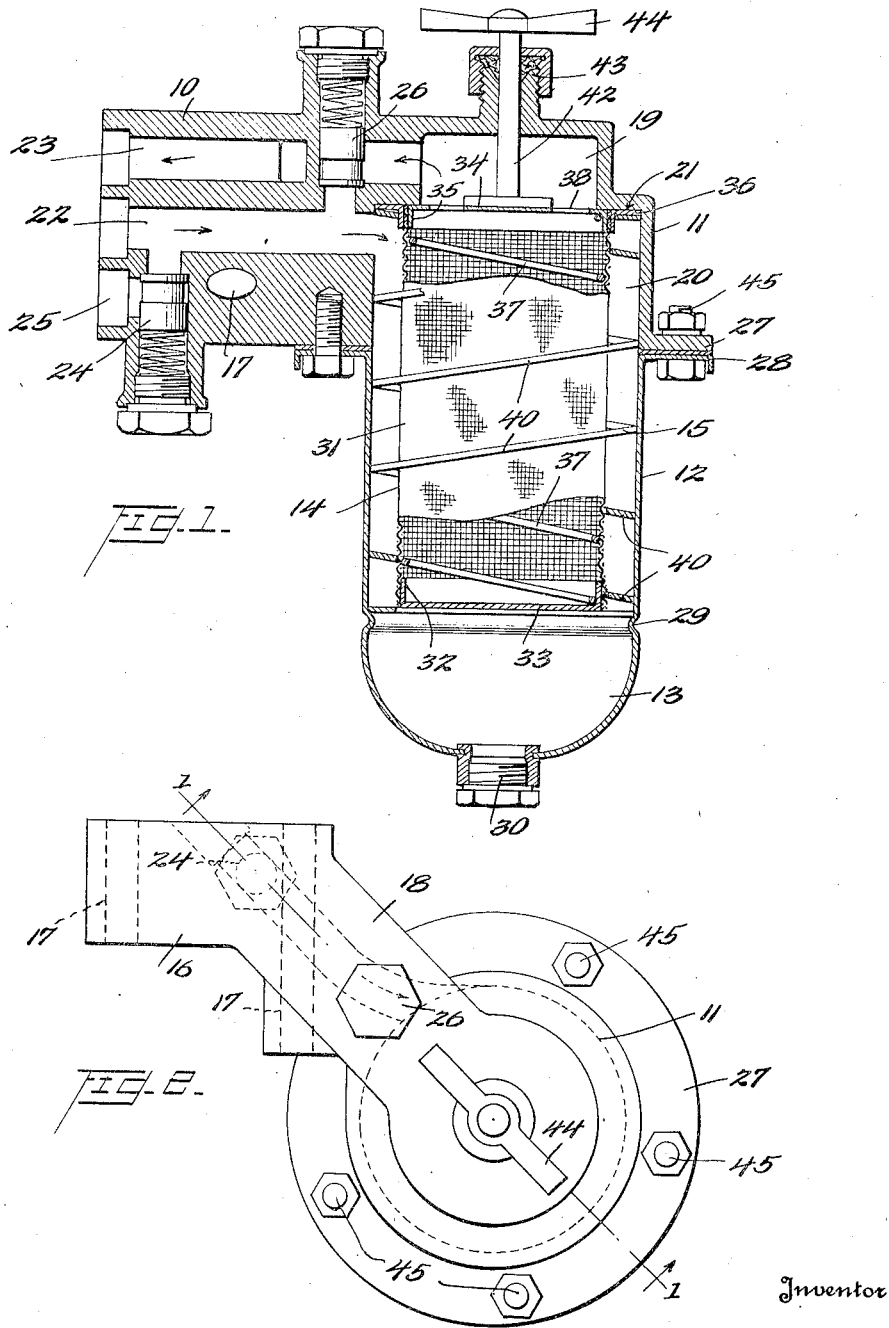

1,822,006

UNITED STATES PATENT OFFICE

ARTHUR A. BULL, OF DETROIT, MICHIGAN, ASSIGNOR TO HANDY GOVERNOR CORPORATION, OF DETROIT, MICHIGAN, A CORPORATION OF MICHIGAN

FILTER

Application filed June 11, 1929. Serial No. 369,950.

This invention relates to liquid filters, and more particularly to oil filters for the lubricating systems of internal combustion engines.

It is a general object of the present invention to provide a novel and improved type of filter.

More particularly it is an object of the invention to provide a filter in which the filter element can readily be cleaned in situ and having, to a large extent, self-cleaning properties.

Other and further features and objects of the invention will become more apparent to those skilled in the art upon a consideration of the accompanying drawings and following specification, wherein there is disclosed a single exemplary embodiment of the invention with the understanding that various and sundry changes may be made therein such as fall within the scope of the appended claims without departing from the spirit of the invention.

In said drawings:

Figure 1 is a vertical section through an oil filter constructed according to the present invention and taken on line 1—1 of Fig. 2; and Figure 2 is a plan view of the filter.

Filters have been applied to the lubricating systems of automotive engines for several years, and in general may be classified into three groups: First, those arranged on the intake side of the pump; second, those applied to the outlet side of the pump and taking a portion of the circulating oil through the filter and returning the same to the crank case; and third, those on the outlet side of the pump and situated between the pump and the bearings.

The first group of filters are quite ineffective, for if the filtering element is too coarse they do not properly filter out the foreign material, and if the filtering element is made sufficiently fine the suction from the pump is insufficient to draw oil through it, particularly when the oil is cold or viscous. The second type of filter is usually constructed with fabric or other filter cloth and is arranged so that but a small portion of the oil pumped passes through the filter and returns to the crank case, so that these filters do not offer protection to the bearing parts of the engine because the oil supplied thereto is not passed directly through the filter. The third type of filter is efficient insofar as its ability to remove foreign matter is concerned, but ordinarily the capacity is insufficient and compensation for this is made by providing a bypass valve which allows oil to short circuit the filter when the filter resistance increases due to clogging. Obviously such a filter does not offer full protection to the bearings of the engine, for it is the most important duty of the filter situated between the pump and the bearings to remove all the dirt, filings and other foreign matter which inevitably accumulates in the engine during the process of manufacture and which subsequently accumulates during the operation of the engine.

In accordance with the present invention the filter is constructed to be classified in the third group, but as a filtering element use is made of a screen having a sufficiently fine mesh to remove the heavier and injurious particles and having a sufficient area to provide a maximum flow so that a bypass valve is unnecessary. It is constructed to be substantially self-cleaning and yet is provided with means for manually cleaning without disassembling it.

Referring to the drawings, the filter will be seen to comprise four essential parts, the main casting 10 including the cap 11; the lower casing 12 having formed integral therewith the sump 13; the filter screen assembly 14; and the combined liquid guide and cleaner strip 15, all assembled as shown in Fig. 1.

The main casting 10 is provided with a flange 16 adapted to be secured by bolts, passing through the opening 17, to the crank case of an interal combustion engine. This flange 16 is connected by a neck portion 18 to the cap portion 11 which is provided with the upper cavity 19 and the lower cylindrical cavity 20 with the shoulder 21 between the cavities. Through the flange and neck are the inlet and outlet openings 22 and 23 respectively, the outlet opening emerging from the cavity 19 and the inlet opening tangentially entering the upper portion of the cavity 20. An overflow valve 24 is provided so that in case the bearings cannot use all of the oil pumped by the pump, which has its discharge connected to the inlet 22 through a suitable opening in the crank case, the excess oil will open the valve and return to the crank case through the overflow opening 25. A bypass valve 26 is shown to permit the passage of oil around the filter in case the filter becomes clogged, but this valve is not necessary with this type of filter and is applied merely as a safeguard or in case it is desired by the manufacturer. The spring can be made quite stiff to prevent it from opening until the pressure against it is quite high.

The cap is provided with a peripheral flange 27 at its lower edge to which is bolted the flange 28 of the lower chamber 12 which is a sheet metal stamping having an internal diameter the same as that of the cavity 20 and being provided with the substantially semi-spherical sump or sediment chamber 13 previously referred to, separated from the main cylindrical bore of the lower chamber by means of the bead 29. A drain plug 30 is provided in the sediment chamber.

The interior of the cavity 20 and of the lower chamber is preferably substantially circular in cross-section and adapted to receive the filter element 14 which comprises a circular tube 31 of wire screen of desired mesh, closed at the bottom by having its lower edges suitably secured as by solder to the upturned flange 32 of the solid bottom disk 33. The upper end of the screen cylinder is provided with a disk 34 having flanges 35 for attachment to the screen. An extension 36 of the disk provides what may be considered a peripheral flange at the top of the screen adapted to be seated against the shoulder 21 and to closely fit the walls of the cavity 20 to accurately position the screen assembly. In order to provide the necessary rigidity to the screen cylinder a helix, as wire 37, is arranged within it to compensate for the pressure of the oil on the outer surface.

Oil enters the chamber surrounding the outside of the screen and is forced through the screen, emerging through the openings 38 in the upper disk 34, entering the minor cavity 19 and thence out through the outlet opening 23. In order that the oil may have access to the whole exterior surface of the screen and yet may flow substantially parallel to this surface to keep the sediment washed off, baffle strip 40 is formed into an edgewise helix whose inner edge closely engages the surface of the screen material 31 and whose outer edge closely engages the inner wall of the main cavity and screen chamber. This helix is preferably made from spring material and its lower end bears on the inturned bead 29, while its upper end, which is flattened into a plane, bears beneath the flange 36 and presses it tightly against the shoulder 21. This baffle strip therefore forms the main support for the screen.

It will be noted that the inlet passage 22 enters the space between the first upper turns of the helix in a direction substantially tangential to the surface of the screen and that oil must then flow around the helical groove formed between the turns of the baffle strip and in so doing is brought into engagement with the whole surface of the screen. In circulating over the surface by virtue of the tangential flow and this baffle action, it continually washes away the separated foreign material and deposits the same into the sump or sediment chamber 13 after it is discharged from the last turn of the helix. This constitutes the self-cleaning action of the filter.

In order that the filter may be more completely cleaned manually, a shaft 42 is attached to the upper disk 34 of the screen, passes through the stuffing box 43 in the upper part of the cap 11, and is provided with a handle 44 whereby rotation may be imparted to the screen. The helical strip 40 is prevented from turning in respect to the casing, and hence as the screen is rotated it is scraped by the inner edge of the helical strip, and it will be seen that one full revolution of the screen will cause the whole surface thereof to be scraped clean. It should also be noted that the sediment thus removed will be washed down the helical groove by further incoming oil and will thus be deposited in the sediment chamber where it can be withdrawn from time to time by removing the drain plug 30.

If it is desired to give the filter screen a more complete cleaning or to renew it, this can be readily done by removing the handle 44 and the bolts 45, withdrawing the lower chamber 12, and then removing the screen.

A filter of this type is highly efficient and is as completely effective as a filter can be made to operate under the varying conditions of oil viscosity existing in automative practice, where temperatures vary from many degrees below zero to many degrees above one hundred, and where oil viscosities vary from that of water to that of cold molasses.

Having thus described the invention, what is claimed as new and desired to be secured by Letters Patent is:

1. In a filter, in combination, an outer casing of cylindrical form, means to supply liquid tangentially at one end of said casing, a cylindrical filter element within said casing, a liquid guiding strip of helical form separate from the casing to continuously guide the liquid downwardly over said element from the initial tangential supply, the inner edge of said strip being in scraping engagement with the said element, means to cause relative rotation between said element and edge to clean the filter and an outlet for filtered liquid from within said element.

2. In a filter, in combination, an outer casing having a cylindrical inner surface, a liquid inlet to said casing, a cylindrical screen in said casing coaxial with said inner surface and adapted to have the liquid pass inwardly therethrough, a separate helical strip between and engaging the said inner surface and the outer surface of said screen and forming a channel from said inlet, an outlet from the interior of said screen, and means to cause relative rotation between said screen and helical strip to clean the screen.

3. In an oil filter, in combination, a casing having a substantially cylindrical main cavity, a cavity of smaller diameter above the main cavity and forming a shoulder therebetween, a cylindrical screen having a closed bottom and open top arranged within said main cavity with the top abutting said shoulder, an outlet from said small cavity, an inlet to said main cavity, and a guide strip adapted to conduct the inflowing liquid helically about said screen, said guide strip resiliently holding said screen against said shoulder.

4. In an oil filter, in combination, a casing having a substantially cylindrical main cavity, a cavity of small diameter above the main cavity and forming a shoulder therebetween, a cylindrical screen having a closed bottom and open top arranged within said main cavity with the top abutting said shoulder, an outlet from said small cavity, an inlet to said main cavity, and a guide strip adapted to conduct the inflowing liquid helically about said screen, an abutment near the bottom of said casing, an external, peripheral flange on the top of said screen, said strip being sprung between said abutment and flange to support the screen for rotation within the strip.

5. In an oil filter, in combination, a casing having a substantially cylindrical main cavity, a cavity of smaller diameter above the main cavity and forming a shoulder therebetween, a cylindrical screen having a closed bottom and open top arranged within said main cavity with the top abutting said shoulder, an outlet from said small cavity, an inlet to said main cavity, and a guide strip adapted to conduct the inflowing liquid helically about said screen, an abutment near the bottom of said casing, an external, peripheral flange on the top of said screen, said strip being sprung between said abutment and flange to support the screen for rotation within the strip, and a handle extending from said screen through said casing for rotating said screen.

6. In an oil filter, in combination, a cap member having an extension provided with inlet and outlet passages and having a main and secondary cavity connected respectively to said inlet and outlet passages, a shell member secured to said cap and providing an extension of the main cavity and a sump, a cylindrical screen having a top flange abutting a shoulder between said cavities and a closed bottom, a helical spring strip surrounding and having its inner edge engaging the surface of said screen and its outer edge engaging the wall of said main cavity, means to rotate said screen within said strip to clean the outer surface of said screen, said strip maintaining the screen flange against said shoulder.

7. In a filter, in combination, a casing having a shoulder, a screen in said casing and having a radial flange engaging said shoulder, a helical strip between said casing and screen and engaging both, said strip being formed of spring material and bearing at one end on said flange and at the other on said casing and means to effect relative rotation between said screen and strip.

In testimony whereof I hereunto affix my signature.

ARTHUR A. BULL.